United States Patent
Nääppä

(10) Patent No.: US 6,685,877 B1
(45) Date of Patent: Feb. 3, 2004

(54) APPARATUS FOR HEATING FLOWING MATERIAL CONTAINING SOLIDS

(75) Inventor: Tapio Nääppä, Holmankuja (FI)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 10/031,966

(22) PCT Filed: Jul. 21, 2000

(86) PCT No.: PCT/FI00/00656

§ 371 (c)(1), (2), (4) Date: Apr. 24, 2002

(87) PCT Pub. No.: WO01/09398

PCT Pub. Date: Feb. 8, 2001

(30) Foreign Application Priority Data

Jul. 29, 1999  (FI) ............................................. 19991657

(51) Int. Cl.[7] ................................................. C22B 3/02
(52) U.S. Cl. .......................... 266/101; 266/170; 165/95
(58) Field of Search ................................. 266/101, 170; 165/95

(56) References Cited

U.S. PATENT DOCUMENTS 5,027,891 A * 7/1991 Fulford et al. ................. 165/95
5,071,477 A * 12/1991 Thomas et al. ................ 75/744

* cited by examiner

Primary Examiner—Melvyn Andrews
(74) Attorney, Agent, or Firm—Morgan & Finnegan, LLP

(57) ABSTRACT

The invention relates to an apparatus for the heating of flowing material containing finely divided solids, such as concentrate slurry containing precious metals and/or precious minerals, up to a desired temperature range, for instance the temperature range applied in a treatment process of said material, said apparatus comprising means for feeding and removing the medium used for heating as well as means for feeding and removing the material to be heated in and out of the apparatus. According to the invention, both the flowing space of the material to be heated and the flow channels (3) of the heating medium are installed in an essentially vertical position, so that the material to be heated can be fed to the bottom part of the flowing space, and the heating medium can be fed to the top part of the flow channels (3), and that in the feed chamber (5) of the material to be heated, there are installed means (9) for cleaning the feed chamber (5).

8 Claims, 1 Drawing Sheet

APPARATUS FOR HEATING FLOWING MATERIAL CONTAINING SOLIDS

Figure 1:
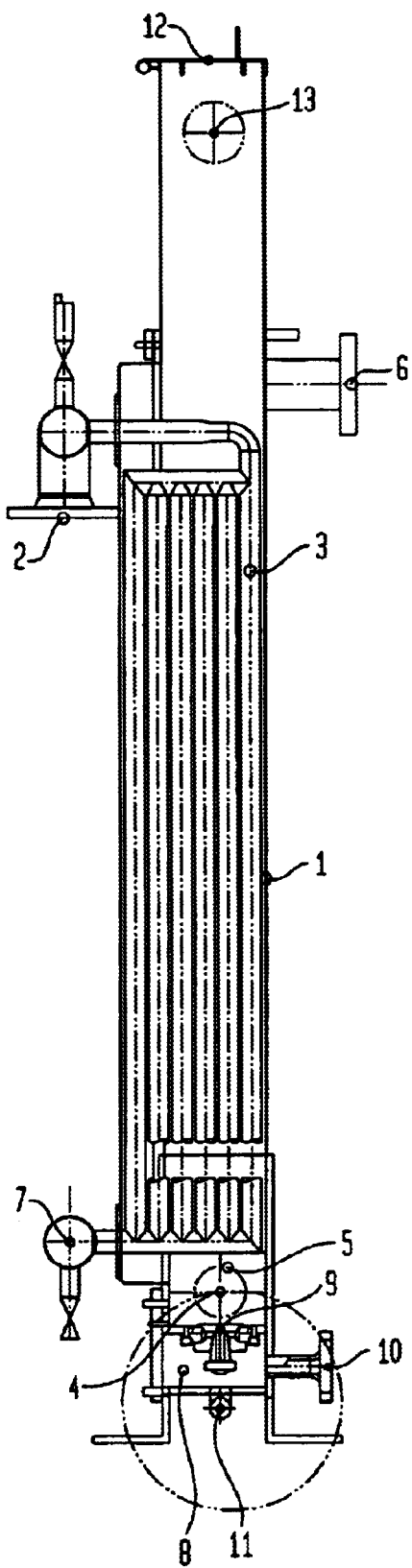

The present invention relates to a device for heating flowing material containing finely divided solids, such as concentrate slurry containing precious metals and/or precious minerals, up to a desired temperature range, for instance to a temperature range used in the treatment process of said material.

The heating of a concentrate slurry containing finely divided solids, such as precious metals and/or precious minerals, up to the temperature range used in the treatment process is usually carried out in a heat exchanger with a hot, liquid medium, such as water or vapor. However, the concentrate slurry is an extremely abrasive and easily settling material which is difficult to treat in heat exchangers. The reason for said difficulty is that the ducts provided in heat exchangers for the flowing of the heated material often are essentially very narrow, and the duct walls are thin. Consequently, in the treatment of concentrate slurries, the heat exchanger ducts wear rapidly off or are blocked, if the flow is too weak in order to carry the solids along with the liquid phase present in the slurry.

The object of the present invention is to eliminate some of the drawbacks of the prior art and to achieve and improved apparatus that is more secure in operation for heating flowing material containing finely divided solids, such as concentrate slurry containing precious metals and/or precious minerals, up to the temperature range applied in the treatment process of said material, when a heat exchanger is employed for heating. The essential novel features of the invention are apparent from the appended claims.

According to the invention, the heating of flowing material containing finely divided solids, such as concentrate slurry containing precious metals and/or precious minerals, up to a desired temperature range is carried out in a heat exchanger that is set in an essentially vertical position. The medium, such as water or vapor, used in the heat exchanger for heating the material is conducted to flow channels that are advantageously installed, apart from the adjusting elements connected to the medium inlet and outlet conduits, in an essentially vertical position, so that the medium used for heating proceeds in the channels from top to bottom. Moreover, the flow channels of the medium used for heating are installed, with respect to each other, so that they are located essentially at regular intervals. In addition, the flow channels are advantageously provided, at least as regards the surface that gets in contact with the heated material, with a particular wearing element, which further reduces the wearing effects of the material to be heated. In shape, the flow channels are advantageously tubular, but they can also have some other shape, for instance rectangular or square in cross-section.

In the apparatus according to the invention, the flowing material containing finely divided solids, such as concentrate slurry containing precious metals and/or precious minerals, is fed from bottom to top, essentially in a vertical position in between flow channels contained by the medium used for heating, and consequently in the opposite direction with respect to the flowing direction of the heating medium. With respect to each other, the flow channels of the heating medium are installed so that the material to be heated is maintained in suspension, which prevents the classification of said material. Thus the transversal flowing area of the flowing space of the material to be heated and the transversal flowing area of the flow channels of the heating medium are mutually matched in order to keep the material to be heated in suspension essentially throughout the heating process. The flowing of the material to be heated is advantageously turbulent, but when the flowing takes place essentially vertically upwards, the settling of the solids contained in the material to be heated does not occur as easily as in a corresponding, essentially horizontal flow.

The flow channels of the heating medium used in the apparatus according to the invention are advantageously interconnected to form a flow channel system, so that said flow channel system can be connected to the housing element of the apparatus according to the invention, advantageously by a flange joint, for example. Thus the connecting of the flow channel system to the apparatus housing also constitutes part of the support structure of said apparatus. When the flow channel system is attached to the housing element by a flange joint, it can easily be detached from the housing when necessary, for instance for possible maintenance of the flow channel system.

In the flow channels of the apparatus according to the invention, there is advantageously maintained a pressure that is higher than at least the hydrostatic pressure of the material to be heated. This prevents, in the event of possible damages, the access of the material to be heated to the flow channels consisting of the heating medium. When desired, also that part of the apparatus according to the invention that contains the material to be heated can be pressurized. In that case, when defining the pressure to be maintained in the flow channels, also the pressure in the part that contains the material to be heated must be taken into account.

In order to feed the material to be heated into the apparatus according to the invention, in the bottom part of the apparatus, advantageously underneath the heating medium flow channel system, there is provided a feed chamber, and the walls of said feed chamber are, at least as regards the sections that are in contact with the material to be heated, essentially equally thick as the walls of the flow channels, and advantageously coated with some wear-proof material. On the bottom of the feed chamber of the material to be heated, there is advantageously attached an adjusting element, such as a valve, in order to adjust the medium flow coming from the chamber formed underneath said adjusting element. When necessary, in the chamber formed underneath said adjusting element, there can be fed gas, such as air, and/or liquid, such as water, in order to advantageously improve the functionality of the apparatus.

Advantageously the adjusting element attached on the bottom of the feed chamber of the material to be heated is a mushroom valve with replaceable wearing parts and sealing. The valve is arranged to operate by the pressure of the gas and/or liquid to be fed in the chamber formed underneath the valve. The mushroom element of the valve rises upwardly by the pressure of the gas or liquid fed in the chamber, in which case the medium flowing from the valve, advantageously a gaseous medium, lifts the possible coarser solid particles of the material to be heated advantageously back to the material flow. On the other hand, the liquid medium to be fed in the chamber is mainly used for preventing the blocking of the apparatus according to the invention, if the velocity of the material to be heated is too low, or if the material to be heated contains particles so coarse that they are not carried along with the flow. Normally the medium that is fed via the chamber located underneath the adjusting element is used in the apparatus according to the invention preferably so that the employed medium is mainly a gaseous medium, which is replaced by a liquid medium or into which there is added liquid medium, when the surfaces of the adjusting element should be washed.

The invention is explained in more detail with reference to the appended drawing, which illustrates a preferred embodiment of the invention, seen from the side in a partial cross-section.

According to the drawing, the heating of a flowing concentrate slurry containing finely divided solids, such as precious metals and/or precious minerals, up to a desired temperature range applied in the treatment process of said material, is carried out in an essentially vertically installed heat exchanger 1. The water or vapor needed in the heating is fed to the top part of the heat exchanger 1, via a feed duct 2, to essentially vertically installed flow channels 3, where the flowing direction of the heating medium proceeds from top to bottom. As for the concentrate slurry to be heated, it is fed via its inlet conduit 4 to a feed chamber 5 provided in the bottom part of the heat exchanger 1. From the feed chamber 5, the concentrate slurry to be heated is further conducted from the bottom upwards in between the flow channels 3. When flowing between the flow channels 3, the concentrate slurry to be heated is maintained in suspension in order to prevent classification. The heated concentrate slurry is further removed from the top part of the heat exchanger 1 via an outlet conduit 6. The water or vapor used for heating is discharged via an outlet conduit 7 provided in the bottom part of the heat exchanger 1.

Moreover, underneath the concentrate slurry feed chamber 5, there is formed a chamber 8 whereto there is fed, via a feed conduit 10, air and/or water used in the cleaning of the feed chamber 5. In order to conduct the air and/or water that was fed into the chamber 8 further to the concentrate slurry feed chamber 5, on the bottom of the concentrate slurry feed chamber 5 there is installed a mushroom valve 9 that is operated by the pressure defined by the air and/or water fed in the chamber 8. By means of the air and/or water fed in said chamber 8, the bottom of the concentrate slurry feed chamber 5 is cleaned of possible concentrate particles that came along with the concentrate slurry and were left on the bottom, which particles are not—owing to their coarseness, for example—carried along with the upwardly, from bottom to top, flowing vertical concentrate slurry flow. The material that should be removed from the chamber 8 by cleaning, as well as the medium used in the cleaning process, are discharged from the heat exchanger 1 via a discharge conduit 11 provided on the bottom of the heat exchanger 1.

Further, in order to provide for the maintenance of the apparatus 1 according to the invention, in the top part of the apparatus, there is installed a door 12. Moreover, in the drawing there is shown, marked with number 13, an overflow conduit wherethrough the heated concentrate slurry can be discharged in possible malfunction situations.

What is claimed is:

1. An apparatus for the heating of flowing material containing finely divided solids, to a desired temperature range, said apparatus comprising:

a first feeding element for feeding a heating medium into an upper portion of flow channels disposed within the apparatus;

a first removing element for removing the heating medium from a lower portion of the flow channels;

a second feeding element for feeding the flowing material into a feed chamber within the apparatus;

a second removing element for removing the flowing material from an upper portion of a flow space, in which flowing material is heated as it flows in a substantially upward direction;

the feed chamber disposed substantially at a lower portion of the apparatus and in fluid communication with the flow space, the flow space disposed vertically above the feed chamber and in fluid communication therewith, the flow space in fluid contact with the flowing material, the flow channels within the apparatus, for channeling the heating medium from the first feeding element to the first removing element, the flow channels being disposed in a substantially vertical direction; and a cleaning chamber for cleaning sediment from the feed chamber, the cleaning chamber being in fluid communication with the feed chamber, and adapted to introduce a cleaning agent into the apparatus via the feed chamber.

2. An apparatus according to claim 1, further comprising an adjusting element installed on a lower portion of the feed chamber between the feed chamber and the cleaning chamber for feeding the cleaning agent into the feed chamber, the adjusting element opening in response to an increase in pressure of the cleaning agent being fed from the cleaning chamber into the feed chamber via said adjusting element, the adjusting element closing in response to a decrease in pressure of the cleaning agent.

3. An apparatus according to claim 2, wherein the adjusting element installed on the lower portion of the feed chamber is a valve.

4. An apparatus according to claim 1 or 2, wherein the cleaning agent conducted to the feed chamber of the flowing material is a gas.

5. An apparatus according to claim 1 or 2, wherein the cleaning agent conducted to the feed chamber of the flowing material is a liquid.

6. An apparatus according to claim 1 or 2, wherein the flow channels of the heating medium are interconnected and attached to the heat exchanger by a flange joint.

7. An apparatus according to claim 1 or 2, wherein both the adjusting element and the flow channels of the heating medium are, at least for the section that is in contact with the flowing material, coated with a wear-resistant material.

8. An apparatus according to claim 1 or 2, wherein the flow space and the flow channels are mutually matched, in order to keep flowing material in suspension substantially during heating.

\* \* \* \* \*